(No Model.)

H. G. CHASE.
EYEGLASS HOLDER.

No. 296,527.  Patented Apr. 8, 1884.

Attest.
P. F. Lewtich
E. N. Adams

Inventor.
Herbert G. Chase,
pr R. F. Osgood,
Atty.

UNITED STATES PATENT OFFICE.

HERBERT G. CHASE, OF NEW YORK, N. Y.

EYEGLASS-HOLDER.

SPECIFICATION forming part of Letters Patent No. 296,527, dated April 8, 1884.

Application filed January 19, 1884. (No model.)

*To all whom it may concern:*

Be it known that I, HERBERT G. CHASE, of the city, county, and State of New York, have invented a certain new and useful Improvement in Eyeglass-Holders; and I do hereby declare that the following is a full, clear, and exact description of the same, reference being had to the accompanying drawings, in which—

Figure 1:
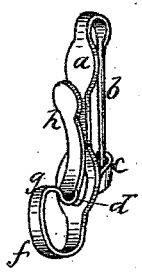
Figure 2:

Figure 1 is a perspective view of the device, and Fig. 2 is an edge elevation of the same.

My improvement relates to that class of eyeglass-holders in which a thin strip of metal is bent into form to make a safety-pin, which can be pinned to the clothing, and in which a spring-hook is used for catching and holding the eyeglasses, the whole being made in one piece. Such devices are already known, the most common form being that in which a thin spring-tongue is cut from the metal, holding only at one end, and being bent outward, so that it touches the inner side of the hook, its object being to form a stop or catch to prevent the eyeglass from being accidentally detached by slipping up over the hook. This device is objectionable, as it is frequently difficult to slip the glasses up past the catch, and the tongue is very liable to get bent back away from the hook and to form no safeguard to the displacement of the glasses.

It is the object of my invention to obviate these difficulties by dispensing with the spring-tongue entirely; and the invention consists of such a device as before described made from a single strip of metal, having a safety-pin and a hook, the hook being formed with an upward bend or depression at its top, so that it will catch the glasses when raised and prevent them from accidentally slipping over and past the end of the hook.

In the drawings, $a$ shows the straight central body of the device. At the top it is bent over and turned down substantially parallel with the body, forming the pin $b$, which catches at the lower end in a small socket or catch, $c$, which is formed by cutting out the center of the body, as shown at $d$, and pressing it out in concave form by any suitable punch or tool. At the lower end it is turned outward, forming the hook $f$, for holding the glasses.

At the top of the hook is made an upward bend or depression, $g$, which forms a cavity rising above the hook proper, and from this bend or depression the end of the strip is carried upward, forming a guide-tongue, $h$, which at the top stands a little off away from the body of the holder.

To insert the glasses on the holder, the back spring of the glasses is inserted over the tongue $h$ and pressed down into the hook, the tongue springing back against the body and holding the glasses inclosed in the hook.

The great advantage in this invention is in the use of the bend or depression $g$, forming a cavity which stands up away from the hook. When the glasses are raised, the spring of the glasses strikes into this cavity, and is prevented from slipping over and off from the end of the hook. One of the most frequent causes of the displacement of the glasses is stooping over forward, which causes the glasses to slip forward on the hook, and if a simple plain hook is used they easily slip off. Where a spring-tongue is used resting against the inside of the hook, as before described, the tongue is very liable to get bent or pressed back, leaving an opening; when the same difficulty occurs. All these difficulties are obviated in this invention, for the glasses in slipping up or forward will catch into the depression standing above the hook, and will be prevented from falling out. At the same time the glasses can be easily removed by hand by giving the proper motion and direction. Another advantage is the combination, with the hook having the cavity at the top, of the spring-tongue rising above the hook and standing off at its top from the body of the device, and forming a guide or way to carry the glasses down into the hook. In ordinary holders of this kind the hook is open at the top and no guide is formed.

I do not wish to confine myself to the precise form of the cavity $g$, as it may be made of different shapes and sizes and still serve the purpose of catching the glasses, as before described; but it is necessary to make the hook with a closed top and to make the top with a hollow, so that the glasses will strike into it before escaping at the outlet.

Having described my invention, what I claim as new, and desire to secure by Letters Patent, is—

1. An eyeglass-holder consisting of a body portion, a safety-pin made substantially parallel with the body, and a hook having a closed top with a depression or cavity formed in the top of the hook, as and for the purpose specified.

2. An eyeglass-holder consisting of a body portion, a safety-pin made substantially parallel with the body, a hook having a closed top with a depression or cavity in the top, and a guide-tongue above the hook, forming a part thereof, touching or nearly touching the body, but standing away from the body at its top, as herein shown and described.

3. An eyeglass-holder consisting of a body portion, a safety-pin made substantially parallel with the body, a socket to receive the end of the safety-pin struck out from the body of the holder, a hook having a closed top and a depression or cavity in the top, and a guide-tongue, forming a part of the hook, standing above the same and serving as a guide to the glasses in entering the hook, as set forth.

In witness whereof I have hereunto signed my name in the presence of two subscribing witnesses.

HERBERT G. CHASE.

Witnesses:
HERBERT L. CHASE,
TREUMUND T. REINHARDT.